United States Patent [19]

Schumacher et al.

[11] Patent Number: 5,375,586
[45] Date of Patent: Dec. 27, 1994

[54] CONDENSATE ISOLATOR AND DRAINAGE SYSTEM FOR FURNACE

[75] Inventors: David B. Schumacher, Franklin; William G. Manda, Murfreesboro, both of Tenn.

[73] Assignee: Inter-City Products Corporation (USA), LaVergne, Tenn.

[21] Appl. No.: 104,859

[22] Filed: Aug. 11, 1993

[51] Int. Cl.$^5$ .............................................. F24H 3/00
[52] U.S. Cl. .................... 126/110 R; 126/116 R; 126/99 R; 137/247.41
[58] Field of Search ............ 126/99 R, 110 R, 116 R, 126/99 A, 99 C, 110 D, 117, 109, 112, 116 A, 116 B; 110/203; 137/132, 192, 135, 247.11, 247.41

[56] References Cited

U.S. PATENT DOCUMENTS

| | | | |
|---|---|---|---|
| 4,289,730 | 9/1981 | Tomlinson | 126/110 R |
| 4,515,145 | 5/1985 | Tallman et al. | 126/110 R |
| 4,543,892 | 10/1985 | Tomlinson et al. | 110/203 |
| 4,603,680 | 8/1986 | Dempsey et al. | 126/99 A |
| 4,682,579 | 7/1987 | Bigham | 126/110 R |
| 4,892,045 | 1/1990 | Schumacher | 110/203 |
| 4,899,726 | 2/1990 | Waterman | 126/110 R |
| 5,146,947 | 9/1992 | Vetrini | 137/433 |

Primary Examiner—James C. Yeung
Attorney, Agent, or Firm—Baker & Daniels

[57] ABSTRACT

The present invention involves a gas furnace having a condensate trap formed in the transition box between the secondary heat exchanger and the exhaust blower. The gas furnace includes gas burners which burn fuel within the passageways of the heat exchanger are induced through its internal passageways by an exhaust blower. The transition box connects the heat exchangers with the exhaust blower and provides a location for condensate to collect for discharge through the integral condensate trap assembly. Also, the exhaust blower housing has drainage ports to convey condensate from the blower and vent back to the condensate trap.

18 Claims, 4 Drawing Sheets

CONDENSATE ISOLATOR AND DRAINAGE SYSTEM FOR FURNACE

BACKGROUND OF THE INVENTION

1. Field of the Invention.

The present invention involves gas furnaces. More specifically, the present invention relates to condensate traps for such furnaces.

2. Description of the Related Art.

Furnaces, particularly high efficiency furnaces operating at 90% or greater efficiency, may have a secondary heat exchanger to extract additional heat from the products of combustion and improve the overall efficiency of the furnace. Secondary heat exchangers have an undesirable side effect involving condensate which results from extracting heat from the combustion products. The increased heat extraction of the secondary heat exchanger causes the discharged products of combustion to be at a relatively low temperature. Liquid residue forms as a result of the low temperatures. In addition, the combustion of conventional hydrocarbon fuels results in the formation of various undesirable acidic compounds. These acidic compounds in the products of combustion tend to dissolve in the liquid residue, or condensate, to thereby form acidic solutions of liquid condensate.

For example, natural gas typically includes some sulfur dioxide and trioxide which forms weak sulfuric acid when dissolved in water vapor condensate. Similarly, carbon dioxide may form a weak carbonic acid in condensate. The discharge of such chemical solution should be controlled, for example, by draining the acidic condensate through a neutralizer such as disclosed in U.S. Pat. No. 4,309,947 to Tomlinson, entitled "Furnace with Flue Gas Condensate Neutralizer", assigned to the assignee of the present invention, the disclosure of which is explicitly incorporated by reference. The liquid condensate itself is separated from the discharging gases by a trap assembly, such as disclosed in U.S. Pat. No. 4,543,892 to Tomlinson, assigned to the assignee of the present invention, the disclosure of which is explicitly incorporated by reference. The trap assembly prevents the products of combustion from escaping from the furnace through the condensate drain line and entering the indoor air.

One problem with separating and collecting liquid residue in a furnace is that the condensate may deposit at any one of a variety of locations downstream from the secondary heat exchanger. To collect condensate, tubing is connected to each piece of equipment in which condensate may form. For example, a tube may be connected to the bottom of the outlet manifold from the condenser, another tube may be connected from the bottom of the connector box, and another tube may be connected from the lower end of the exhaust flue. The tubes are then connected to a trap assembly to prevent the escape of products of combustion through any of the condensate drainage lines.

In order to eliminate multiple tubes which obstruct access to the furnace, a blower and collector assembly may be used as disclosed in U.S. Pat. No. 4,892,045 to Schumacher, assigned to the assignee of the present invention, the disclosure of which is explicitly incorporated by reference. The blower and collector assembly disclosed in the Schumacher patent eliminates the multiple tubes from the various points in the furnace, providing all the drainage needed through a single condensate line.

The blower and collector assembly of the abovementioned Schumacher patent greatly improves on the design of prior art condensate drainage systems. However, a trap assembly is also a desirable component of a condensate drainage system. Trap assemblies are conventionally installed on the drainage line, usually by external mounting, in order to provide a single condensate drainage line and prevent the escape of combustion gases through the drainage line. The separate provision of a trap assembly on the drainage line introduces further complications to the installation of such a furnace, and may thereby increase the difficulty in installing or servicing the furnace.

What is needed is an improved condensate collector assembly.

SUMMARY OF THE INVENTION

The present invention involves a condensate collector which incorporates a condensate trap. The condensate collector forms a transition box between the secondary heat exchanger and the exhaust blower, and a trap assembly is formed at the bottom of the transition box to prevent the entry of air through the condensate drain system. The present invention provides a condensate trap incorporated into the transition box assembly, thus eliminating the need for multiple condensate tubes and externally mounted drain traps.

The transition box assembly of the present invention connects the outlet of the secondary heat exchanger and the inlet of the exhaust blower. The fluid circuit between the opening to the secondary heat exchanger outlet and the opening to the inducer fan provides for a lower portion which includes the trap assembly. Further, the transition box is located at the lowest point downstream of the secondary heat exchanger so that condensate will flow by force of gravity to the trap assembly. The trap assembly may then be fluidly coupled by a tube or other suitable conduit to an acidic condensate neutralizer and/or drain.

The structure of the present invention reduces the amount of time and materials required to install a furnace in a building. Conventionally, the points of the furnace where condensate tends to collect are connected by tubing to a condensate trap assembly which is mounted to the side of the housing of the gas furnace. The condensate trap, in turn, is connected to a further piece of tubing for routing the liquid condensate to a neutralizing device and/or a drain. With the present invention, only a single piece of tubing is required to couple the condensate trap of the transition box with the neutralizing device and/or drain. Therefore, the structure of the present invention avoids the step of connecting the condensate trap to the point, or points, of condensate collection and avoids the additional step of mounting the condensate trap.

A furnace utilizing the present invention is also easier to service and less apt to have a fluid line failure. The single drainage line of the present invention is more easily accessed or avoided than the multiple lines in prior art systems. Also, the attachment and detachment of the drainage system to the single drainage line is easier than the prior art systems. With the transition box located at the lowest most point downstream of the secondary heat exchanger, the connections to the discharge line may be located away from the portions of the furnace which are subjected to extreme heat or moving parts, thus minimizing the chance that the drainage line would be damaged or worn by ordinary operation of the furnace.

The present invention, in one form, involves a gas furnace comprising a gas ignitor, a heat exchanger, an exhaust blower, and a transition box assembly. The gas ignitor creates products of combustion which are circulated through a passageway of a heat exchanger for extracting heat from the products of combustion. The exhaust blower is in fluid communication with the heat exchanger and is arranged to draw the products of combustion through the heat exchanger. The transition box assembly fluidly connects the heat exchanger with the exhaust blower. The transition box assembly further includes a condensate trap for removing liquid condensate from the products of combustion.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

The preferred embodiment disclosed below is not intended to be exhaustive or limit the invention to the precise form disclosed in the following detailed description. Rather, the embodiment is chosen and described so that others skilled in the art may utilize its teachings.

Figure 1:
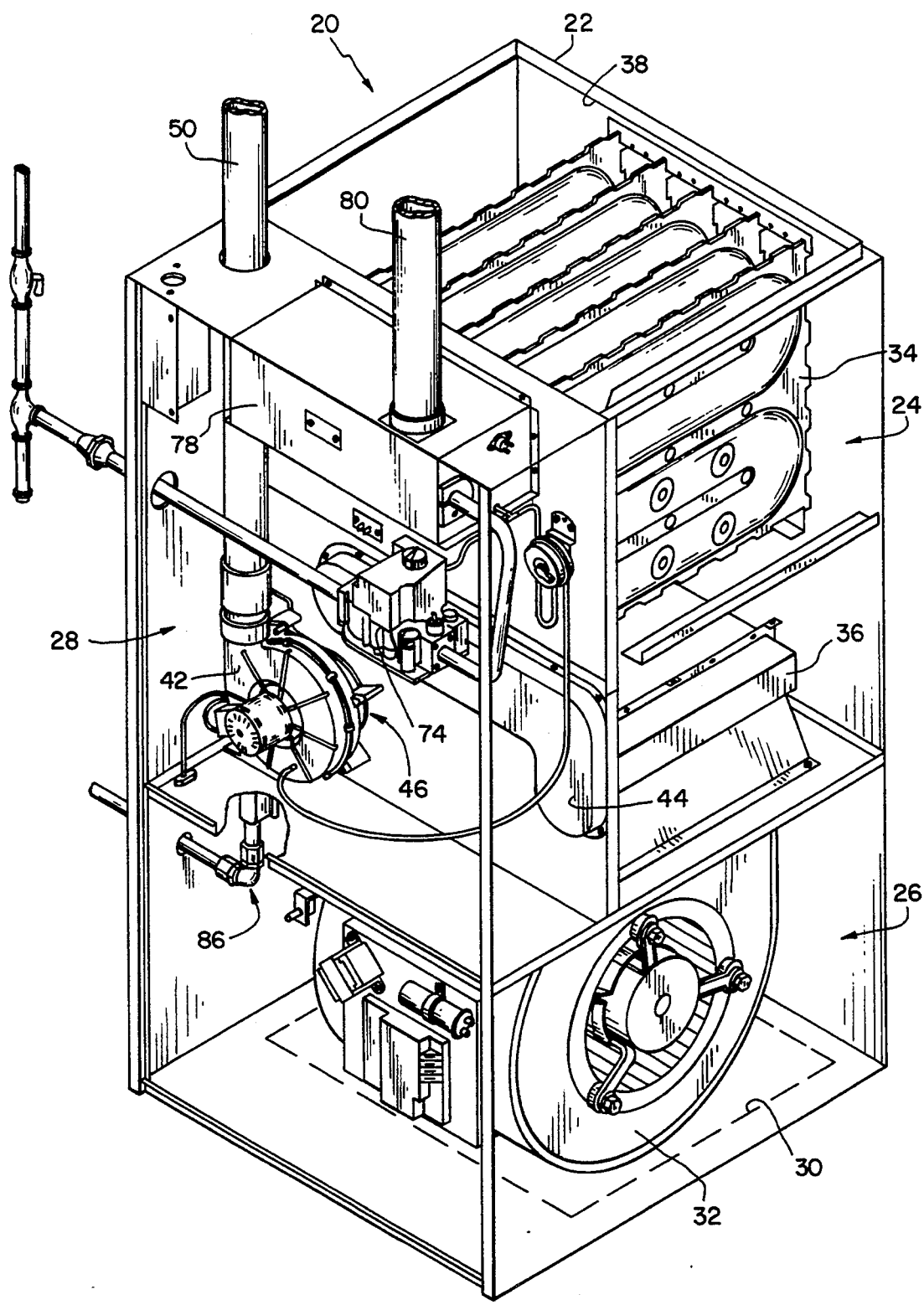
FIG. 1 is a perspective view of a furnace according to the present invention.
Figure 2:
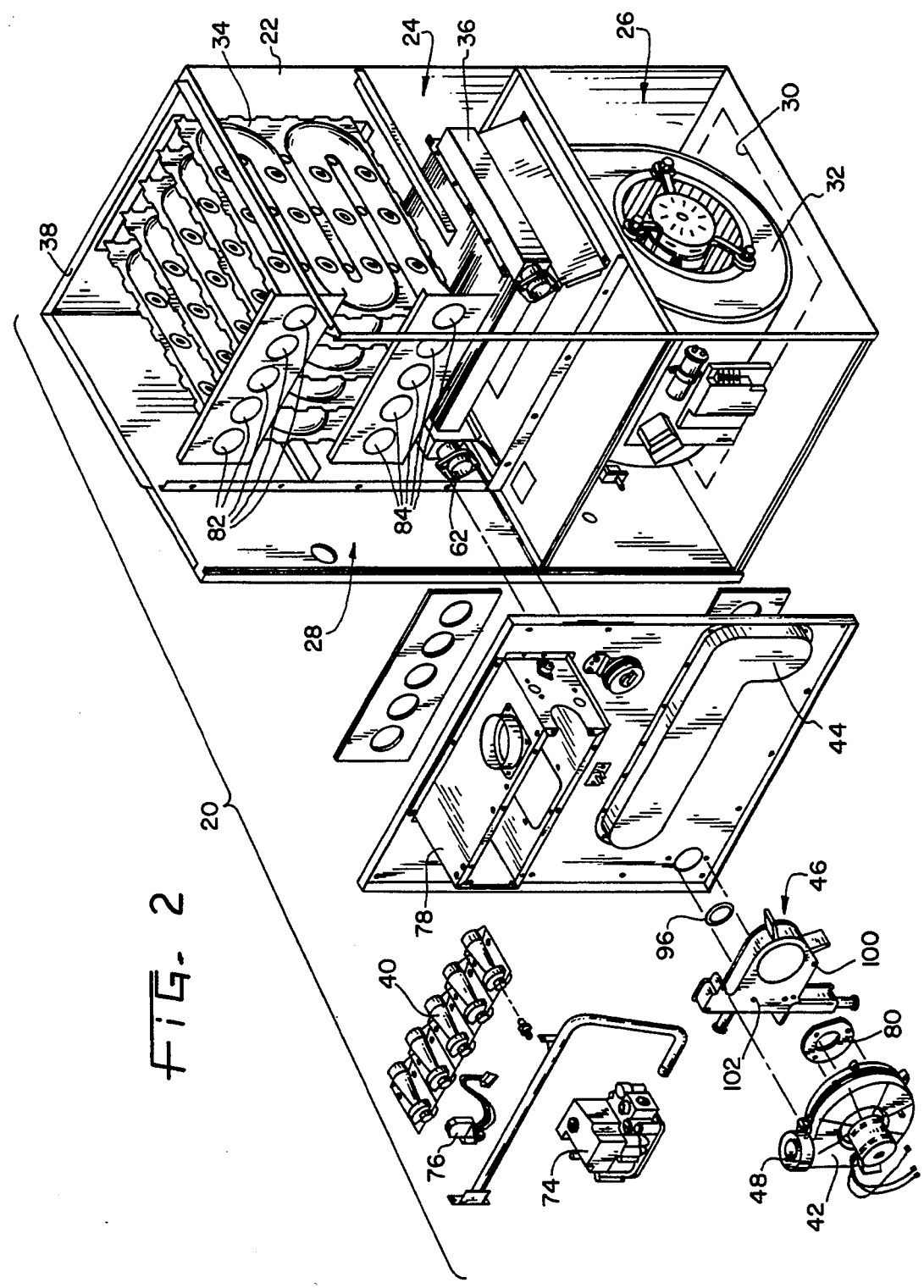
FIG. 2 is an exploded view of the furnace shown in FIG. 1.
Figure 3:
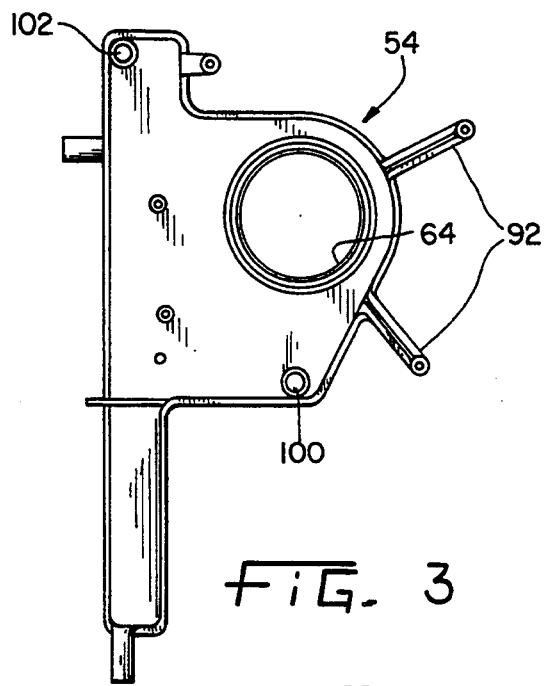
FIG. 3 is a front view of the body of the transition box of the present invention.
Figure 4:
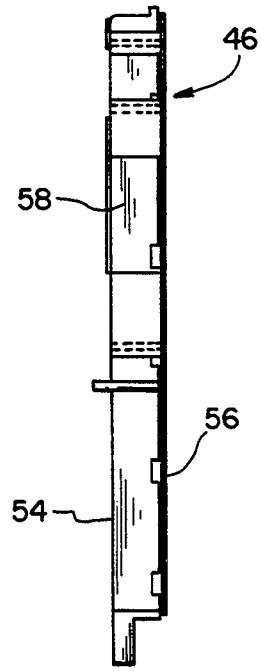
FIG. 4 is a side view of the transition box.
Figure 5:
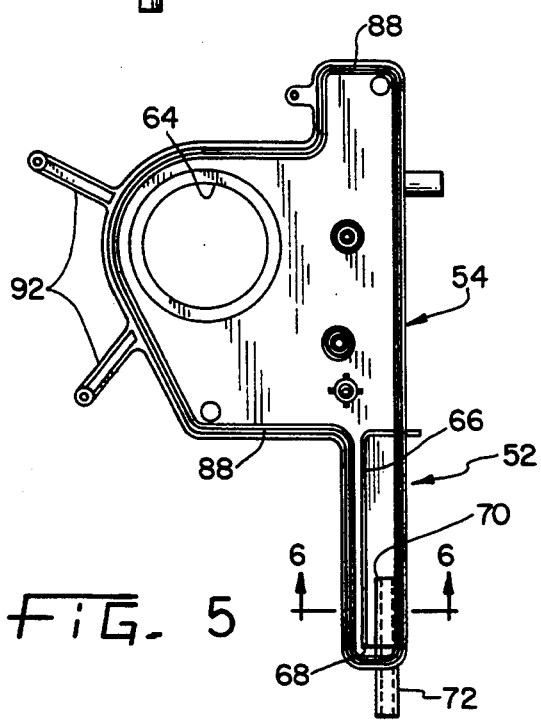
FIG. 5 is an interior view of the body of the transition box.
Figure 6:
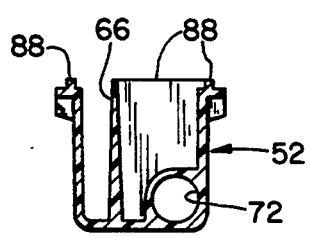
FIG. 6 is a sectional view of the body of the transition box taken along view line 6—6 of FIG. 5.
Figure 7:
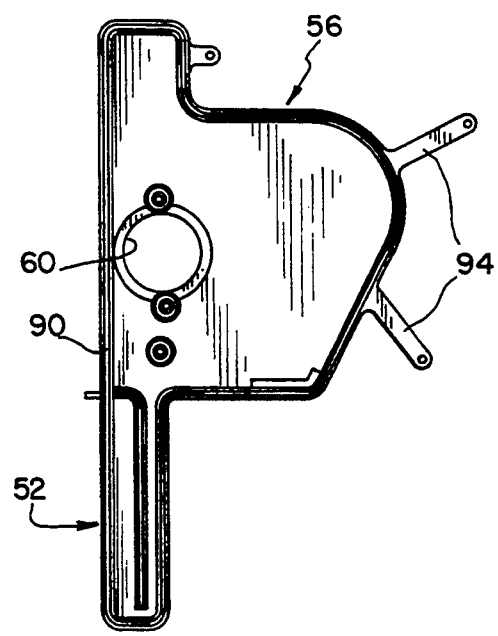
FIG. 7 is a plan view of the cover of the transition box.

The present invention relates to furnace 20, which is shown in FIGS. 1 and 2. Housing 22 of furnace 20 includes plenum portion 24, circulation portion 26, and vestibule portion 28. The present invention concerns the components in vestibule portion 28, and accordingly the other portions of furnace 20 are discussed only briefly below.

Circulation portion 26 includes circulation air inlet 30 and circulation blower 32. Plenum portion 24 includes primary heat exchangers 34, secondary heat exchanger 36, and circulation air outlet 38. The indoor air is heated by circulation blower 32 forcing indoor air over secondary heat exchanger 36 and primary heat exchangers 34. The gases within the heat exchangers are heated by inshot gas burners 40 which ignite the gases to create products of combustion. Exhaust blower 42 induces the flow of the products of combustion through primary heat exchangers 34, collector box 44, secondary heat exchanger 36, to transition box 46. Exhaust blower 42 has an inlet (not shown) connected to transition box 46, and an outlet 48 connected to vent pipe 50.

In accordance with the present invention, transition box 46 includes trap assembly 52 as shown in more detail in FIGS. 3-7. Transition box 46 includes body 54 and cover 56 which define internal chamber 58. The main portion of chamber 58 is generally between inlet 60 of cover 56, which is adapted for connection with outlet 62 of secondary heat exchanger 36, and outlet 64 of body 54, which is adapted for connection with exhaust blower 42. Trap assembly 52 is formed in the lowest extremity of body 54 so that condensate which forms on the walls defining chamber 58 eventually flows downward under the force of gravity to collect at the bottom. Barrier wall 66 is formed in trap assembly 52 and has lower edge 68 which is vertically below upper edge 70 of drain portion 72. With this arrangement, condensate must accumulate to the level of upper edge 70 in order to enter drain portion 72, thus creating a liquid barrier between lower edge 68 and upper edge 70 preventing the escape of products of combustion through drain portion 72.

In operation, furnace 20 starts operation by opening gas valve 74, turning on exhaust blower 42, and activating electronic ignition 76. Exhaust blower 42 induces outdoor air into combustion box 78 through inlet pipe 80. The outdoor air mixes with the gas fuel from gas valve 74 in gas burners 40 and is ignited by electronic ignition 76 while entering heat exchanger inlets 82. The products of combustion traverse the internal passageways of heat exchangers 34 and exit through outlets 84 into a space defined by collector box 44. In primary heat exchangers 34, a significant portion of the heat of the products of combustion is transferred to the indoor air being circulated by blower 32.

However, the products of combustion have an appreciable amount of heat remaining when entering collector box 44. Exhaust blower 42 then induces the products of combustion through secondary heat exchanger 36. Secondary heat exchanger 36 is designed to transfer the remaining heat from the products of combustion to the indoor air. As a result of the secondary heat transfer, the products of combustion exit secondary heat exchanger 36 at a greatly reduced temperature, and enter transition box 46. The gases tend to form condensate in the secondary heat exchanger 36 and transition box 46, depositing liquid condensate on the interior walls. Secondary heat exchanger 36 functions as a condenser for the products of combustion.

The liquid condensate, usually containing acidic residue from the products of combustion, collects by gravity within trap assembly 52. Initially, any gases within transition box 46 may exit through drain portion 72. However, liquid condensate soon starts collecting at the bottom of trap assembly 52, eventually forming a small body of liquid (not shown). When the surface of the body of liquid reaches the level of wall 66, gases within the main portion of transition box 46, i.e., the space between inlet 60 and outlet 64, may no longer freely traverse through drain portion 72. Liquid condensate may continue to collect in trap assembly 52 until the liquid level reaches upper edge 70 of drain portion 72. Once the liquid is to upper edge 70, any further condensate accumulation in trap assembly 52 causes some of the liquid condensate to enter drain portion 70 for discharge through drain line 86. Condensate from the products of combustion forms downstream of secondary heat exchanger 36, and transition box 46 is disposed as low as any of the furnace components downstream of secondary heat exchanger 36, e.g., exhaust blower 42 and vent pipe 50.

In the preferred embodiment, transition box 46 is formed from a polycarbonate material such as MAK-ROBLEND DPA-1368 made by Mobay Corporation of Pittsburgh, Pa. The thickness of the walls of body 54 and cover 56 are preferably about 2.4 mm, although these dimensions may be varied for different furnaces. In the preferred embodiment, body 54 includes lip 88 which is structured and arranged to interfit with groove 90 of cover 56 to thereby hold together and seal transition box 46. Although not essential, other ancillary elements may be used with transition box 46. For example, body 54 may also include supporting arms 92, and cover 56 may also include complementary supporting arms 94. Gasket 96 may be disposed between secondary heat exchanger outlet 62 and cover inlet 60, both of which may be joined together by screws or other fasteners. Orifice disc 80 may be disposed between transition box outlet 64 and the exhaust blower inlet, all three of which may be joined together by screws or other fasteners.

Figure 8:
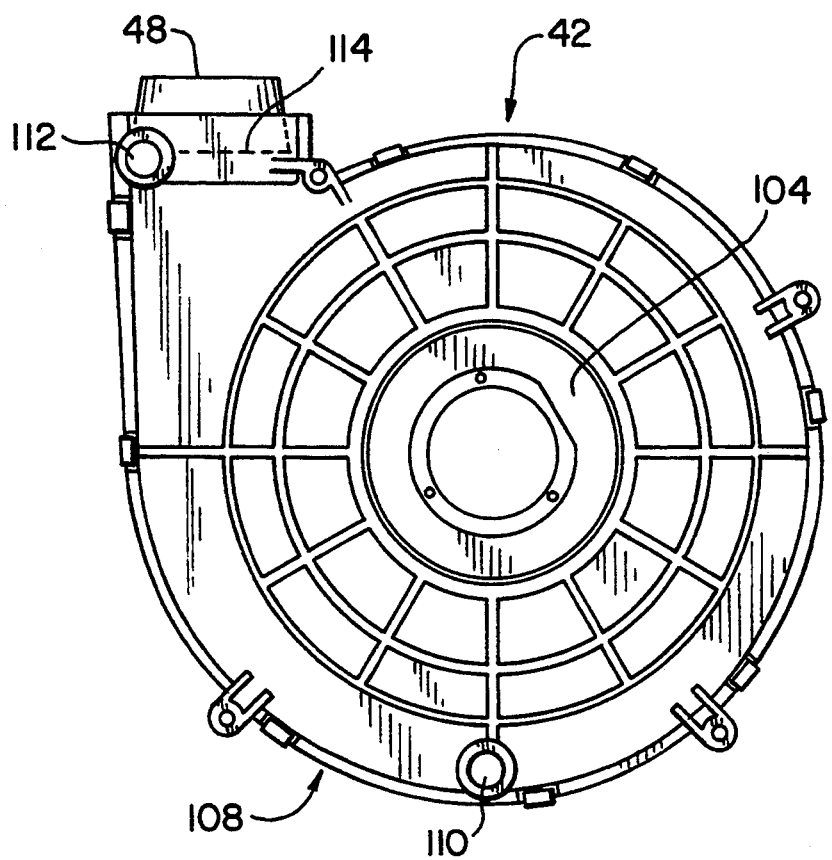
FIG. 8 is a front view of the blower assembly taken along view line 8—8 of FIG. 9.
Figure 9:
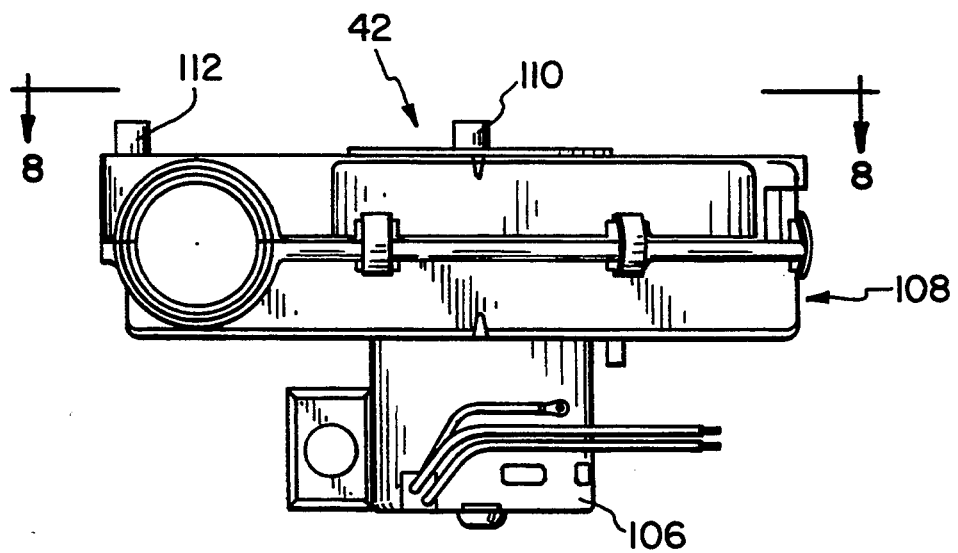
FIG. 9 is a side view of the blower assembly.

In order to facilitate the drainage of condensate which may form downstream of secondary heat exchanger 36 in exhaust blower 42 or vent pipe 50, transition box 46 includes drainage holes 100 and 102. Exhaust blower 42 is an assembly which includes orifice disc 80, motor 106, housing 108, and an impeller wheel (not shown) disposed within housing 108. Housing 108 is shown in more detail in FIGS. 8 and 9, including blower drainage port 110 and vent drainage port 112. When housing 108 is attached to transition box 46, ports 110 and 112 extend through holes 100 and 102, respectively, to allow condensate to drain back into transition box 46.

Specifically, blower drainage port 110 is located at the lowest point of housing 108, so that condensate which forms of the interior walls of exhaust blower 42 tends to flow down and exit housing 108 through port 110. Also, vent discharge port 112 is in communication with an annular condensate trough 114 which is formed in the upper portion of housing 108, below outlet 48 and directly under the walls of vent pipe 50. Any condensate formation in vent pipe 50 occurs on the interior walls, which then tends to flow into trough 114 so that it may exit through port 112. With this structure, condensate forming anywhere in the furnace tends to drain back to transition box 46, whether from vent pipe 50, exhaust blower 42, or secondary heat exchanger 36, to be safely and effectively discharged through integral trap 52.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A gas furnace comprising:
    means for igniting a gaseous fuel and creating products of combustion;
    a heat exchanger for extracting heat from the products of combustion, said heat exchanger associated with said igniting means and defining a passageway for the products of combustion;
    an exhaust blower in fluid communication with said heat exchanger and arranged to draw the products of combustion through said heat exchanger; and
    a transition box assembly fluidly connecting said heat exchanger and said exhaust blower, said transition box assembly including a condensate entrance opening immediately adjacent to and in fluid connection with said exhaust blower through which said transition box assembly collects liquid condensate formed within or downstream of said exhaust blower, said transition box assembly including an integrated condensate trap for removing liquid condensate from said transition box assembly, said condensate trap including a barrier wall and a drainage hole, said barrier wall extending below said drainage hole to prevent the combustion gases from escaping through said drainage hole.

2. The gas furnace of claim 1 wherein said transition box assembly is made from a polycarbonate material.

3. The gas furnace of claim 1 wherein said transition box assembly comprises a body portion and a cover portion.

4. The gas furnace of claim 3 wherein one of said body portion and said cover portion includes a groove, and the other of said body portion and said cover portion includes a lip.

5. The gas furnace of claim 1 further comprising a secondary heat exchanger coupled to receive products of combustion from said heat exchanger, said secondary heat exchanger coupled to transmit the products of combustion to said transition box assembly.

6. The gas furnace of claim 5 further comprising means for venting the products of combustion from said secondary heat exchanger, wherein said transition box assembly extends lower than any portion of said exhaust blower and said venting means.

7. The gas furnace of claim 6 wherein said venting means includes a blower having a housing, said blower housing including a discharge port located at the lower most point of said blower housing and providing a passage for condensate, said discharge port being in fluid communication with said transition box assembly.

8. The gas furnace of claim 7 further including a vent pipe connected with said blower housing, wherein said blower housing also includes a second discharge port and a trough adjacent said vent pipe, said second discharge port providing a passage for condensate, said discharge port being in fluid communication with said trough and said transition box assembly.

9. The gas furnace of claim 1 wherein said transition box includes a main portion for conducting gaseous products of combustion from said heat exchanger to said exhaust blower, and said condensate trap includes said barrier wall so that accumulated liquid condensate reaching said barrier wall prevents the escape of gases from said main portion of said transition box assembly.

10. The gas furnace of claim 9 wherein said condensate trap includes a drain portion, said drain portion being separated from said main portion by said barrier wall.

11. A system for collecting and draining condensate from a furnace having a condenser, said system comprising:

blower means; and passage means between the condenser and said blower means, said passage means being adapted to convey combustion products and condensate from the condenser to said blower means, and also being adapted to collect the condensate conveyed and drain the condensate from the system, said passage means including a condensate entrance opening immediately adjacent to and in fluid connection with said blower means through which said passage means collects liquid condensate formed within or downstream of said blower means, said passage means including an integrated condensate trap assembly with a barrier wall and a drainage hole, said barrier wall extending below said drainage hole to prevent the combustion products from escaping through said drainage hole.

12. The gas furnace of claim 11 further including gas burner means for producing the combustion products.

13. The gas furnace of claim 11 wherein said passage means includes a transition box assembly fluidly connecting the condenser and said blower means.

14. The gas furnace of claim 13 wherein said transition box assembly is made from a polycarbonate material.

15. The gas furnace of claim 13 wherein said transition box assembly comprises a body portion and a cover portion.

16. The gas furnace of claim 15 wherein one of said body portion and said cover portion includes a groove, and the other of said body portion and said cover portion includes a lip.

17. The gas furnace of claim 13 wherein said blower means includes a housing, said blower housing including a discharge port located at the lower most point of said blower housing and providing a passage for condensate, said discharge port being in fluid communication with said transition box assembly.

18. The gas furnace of claim 17 further including a vent pipe connected with said blower housing, wherein said blower housing also includes a second discharge port and a trough adjacent said vent pipe, said second discharge port providing a passage for condensate, said discharge port being in fluid communication with said trough and said transition box assembly.

* * * * *